EGG COLLECTING DEVICE

Original Filed June 29, 1960 2 Sheets-Sheet 1

INVENTOR.
SEYMOUR PETERSON
BY
Merchant & Merchant
ATTORNEYS

Dec. 29, 1964 S. PETERSON Re. 25,706

EGG COLLECTING DEVICE

Original Filed June 29, 1960 2 Sheets-Sheet 2

INVENTOR.
SEYMOUR PETERSON
BY
Merchant & Merchant
ATTORNEYS

United States Patent Office

Re. 25,706
Reissued Dec. 29, 1964

25,706
EGG COLLECTING DEVICE

Seymour Peterson, Dassel, Minn., assignor to Storm Industries, Inc., Dassel, Minn., a corporation of Minnesota Original No. 3,042,184, dated July 3, 1962, Ser. No. 39,612, June 29, 1960. Application for reissue Apr. 9, 1963, Ser. No. 272,823
7 Claims. (Cl. 198—131)

Matter enclosed in heavy brackets [ ] appears in the original patent but forms no part of this reissue specification; matter printed in italics indicates the additions made by reissue.

This invention relates generally to automatic poultry equipment, and more particularly it relates to an egg collecting device for receiving and transporting eggs.

The demand for clean, unwashed eggs has stimulated the development of this invention and dictated the criteria that an automatic egg collection system have the capacity to protect and deliver eggs that are clean. Therefore, an important object of this invention is the provision of an egg collecting device which is particularly adapted to protect and deliver clean eggs.

Another object of this invention is the provision of an egg collecting device which is designed to accept freshly laid eggs from suitable nesting enclosures and transport the eggs to any desired discharge point, and release them to another adjacent conveyor, egg cleaner, grader, packer, holding device, or any other destination.

Another object of this invention is the provision of an egg collecting device which will flex in any desired direction in order to move the eggs in an upward, downward, leftward, rightward, or circular direction.

Another object of this invention is the provision of an egg collecting device which is adapted to ride on a guide track so as to provide a controlled course of travel for the transportation of the eggs.

Still another object of this invention is the provision of an egg collecting device, the conveyor elements of which are provided with guide track-engaging supporting flanges which are reversible so that when the previously used supporting flanges become worn, the conveyor elements may be reversed so as to provide a new pair of guide track-engaging supporting flanges, whereby to effectively double the useful life of the conveyor.

A further object of this invention is the provision of an egg collecting device which is constructed without complete restrictions across the egg-carrying portion thereof so as to allow brushing or cleaning apparatus to be introduced at any desired point in the system.

Another object of this invention is the provision of an egg collecting device which is provided with cover means for shielding the eggs from contamination by the roosting birds.

A still further object of this invention is the provision of an egg collecting device which is provided with a clean plastic egg-collecting tray for each egg so as to prevent rolling and breakage of the eggs.

Another object of this invention is the provision of an egg collecting device, the conveyor portion of which is constructed so that it will not stretch or shrink during prolonged operation.

Other objects of this invention reside in the provision of an egg collecting device which is simple in construction, economical to manufacture, requires little or no maintenance, is extremely durable and strong throughout continued use, and highly efficient in the vindication of its purpose.

The above and still further objects of this invention will become apparent from the following detailed specification, appended claims and attached drawings.

Referring to the drawings, wherein like reference characters indicate like parts or elements throughout the several views.

Figure 1:
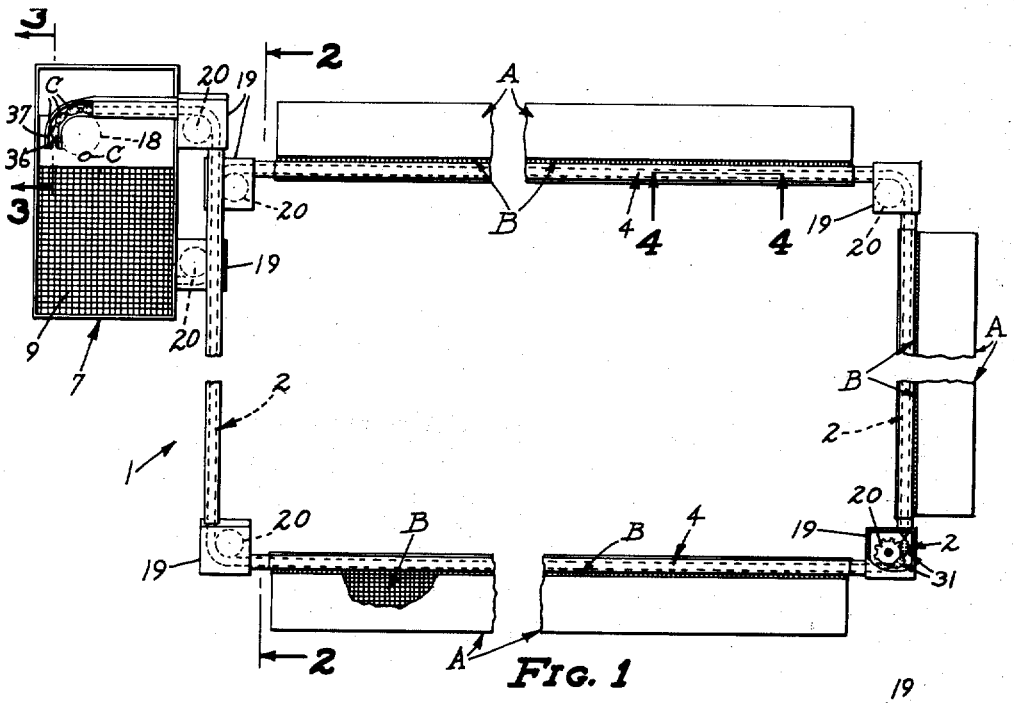
FIG. 1 is a view in top plan of my egg collecting device, some parts being broken away and some parts being shown in section.

Referring to the drawings and particularly FIG. 1 thereof, the reference numeral 1 represents my egg collecting device in its entirety. The reference letter A represents a plurality of nesting enclosures which define laterally opening egg discharge chutes B. The nesting enclosures A are not particularly a part of this invention, but are necessary in order to efficiently explain and describe the operation of this invention. The egg collecting device 1 comprises an endless flexible egg collection conveyor, represented in general by the reference numeral 2. The conveyor 2 is adapted to ride on a guide track 3 which is defined by the bottom wall of a generally cross sectionally rectangular tubular conveyor enclosure, represented in general by the reference numeral 4. The conveyor enclosure 4 is adapted to shield the conveyor 2 and protect the same from roosting birds. It is noted that the enclosure 4 defines lateral openings 4a spaced adjacent the nesting enclosures A for permitting passage of the eggs C on to the conveyor 2.

The conveyor 2 comprises a plurality of link elements, represented in general by the reference numeral 5, which define a plurality of longitudinally spaced recesses 6. In accordance with my invention, a table-like structure represented in general by the reference numeral 7, is disposed adjacent the conveyor 2. The table structure 7 comprises four legs 8 to which an upper shelf 9 is secured, the collected eggs C being deposited upon the shelf 9, as will hereinafter be more fully explained. The table structure 7 further comprises an intermediate frame section 10, which is secured to the legs 8 thereof for mounting conventional conveyor driving mechanism. As seen particularly in FIG. 2, a conventional motor and gear reducer 11 is secured to the frame section 10, and is coupled by means of the drive chain 12 to a large sprocket wheel 13. The sprocket wheel 13 is secured to one end 14 of the drive shaft 15 which is journalled within the mounting bracket 16, the other end 17 of the drive shaft 15 carrying the drive gear 18 which engages the recesses 6 of the link elements 5 whereby to impart a continuous movement to the conveyor 2.

Figure 2:
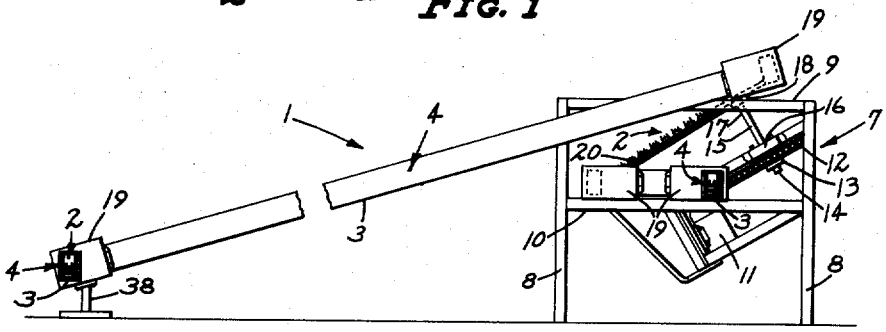
FIG. 2 is a view in vertical section taken on the line 2—2 of FIG. 1, some parts being broken away and some parts shown in section.

Referring to FIGS. 1 and 2, it will be noted that a plurality of box-like corner conveyor housings 19 are disposed at all points at which the conveyor 2 changes direction. The corner conveyor housings 19 carry idler sprockets 20 which define the path of travel of the conveyor 2 and also impart the requisite amount of tension thereto.

Referring now with greater particularity to the conveyor link elements 5, which are shown in greater detail in FIGS. 3–8, the link elements 5 comprise upper and lower generally matching body sections, represented by the reference numerals 21, 22 respectively. The link elements 5 are pivotally secured together in end to end relationship by the elongated fastening bars 23, one each thereof being interposed between adjacent link elements 5. The fastening bars 23 define longitudinally spaced rivet-receiving apertures 24 which are alignable with the corresponding apertures 25 defined in both the upper and lower body sections 21, 22 of the link elements 5 adjacent the forward and rearward ends 26, 27, respectively, thereof. Preferably, and as shown, the apertures 24, 25 in the fastening bars 23 and the body sections 21, 22 receive rivets 28 which are loosely received within the apertures 24 but also serve to secure the upper and lower body sections 21, 22 of the link elements 5 in vertically spaced relationship with one another.

Referring to FIGS. 4–8, the upper body sections 21 of the conveyor link element 5, are transversely cross-sectionally generally U-shaped, and the lower body sections 22 are transversely cross-sectionally generally inverted U-shaped, and both of said body sections 21, 22 define opposed generally longitudinally extending generally coplanar supporting flanges, the upper pair thereof of each link element 5 being represented by the reference character 29a and the lower pair thereof being represented by the reference character 29b. As shown in FIGS. 3–5, and 7, both the upper and lower supporting flanges 29a, 29b, define opposed longitudinally extending generally parallel slots 30 which are spaced generally intermediate the forward and rearward ends 26, 27 respectively of the link element 5. According to present practices, the lower supporting flanges 29b are adapted to support the link element 5 upon the guide track 3, as seen particularly in FIGS. 4, 6 and 7; and the upper supporting flanges 29a are adapted to support the egg collection trays 31, as will hereinafter be described in detail. It should be emphasized that the symmetrical identity of the upper and lower body sections 21, 22 of the link element 5 permits the inversion thereof when the lower supporting flanges 29b become excessively worn from the riding action thereof upon the guide track 3, whereby the above described functions of the upper and lower supporting flanges 29a, 29b are reversed, and the useful life of the conveyor link elements is obviously greatly extended.

In order to further adapt the conveyor 2 for the efficient transportion of eggs C, a plurality of egg collection trays, represented in general by the reference numeral 31, are provided, each of which is carried by one of the link elements 5. The egg collection trays 31 are preferably formed from a resilient nonmetallic material, such as a polyethylene plastic, and each thereof comprises a generally elongated base portion 32, and a plurality of upstanding fingers 33 perimetrically spaced about the base portion 32 and integrally formed therewith so as to selectively cradle an egg C received therein, as seen particularly in FIG. 3. It should be noted, that the front pair of fingers 33a are of a greater height than the remainder of the fingers 33 so as to center the eggs C within the trays 31. For the purpose of providing means for securing each of the trays 31 to a link element 5 in spaced relation therebove, the base portion 32 of each of the trays 31 defines a pair of opposed laterally projecting anchoring tangs 34, which are integrally formed on the base portion 32 of the tray 31, as seen particularly in FIG. 7. The tangs 34 are adapted to be introduced into the slots 30 of the upper supporting flanges 29a when the tangs 34 are flexed inwardly and then snapped outwardly so as to securely anchor the tray 31 to the link element 5.

With reference to FIGS. 3, and 5–8, another extremely important feature of my invention will be described. For the purpose of providing shock-absorbing means for cushioning the reception of an egg C, a cross-sectionally reduced centrally disposed membrane area 35 is defined by the base portion 32 whereby the introduction of an egg C from the discharge chute B (FIG. 7) is occasioned by the generally vertical flexing action of the membrane area 35 so as to virtually eliminate any egg breakage during the transfer of the eggs C from the nesting enclosures A to the upper shelf 9 of the table structure 7.

Figure 3:
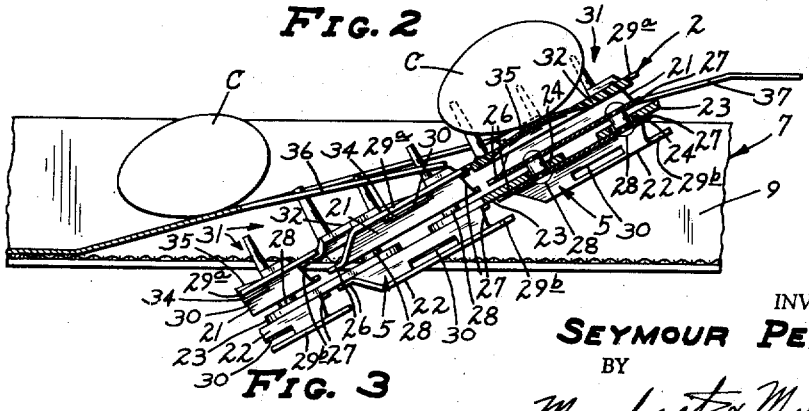
FIG. 3 is an enlarged view taken on the line 3—3 of FIG. 1, some parts being broken away.
Figure 4:
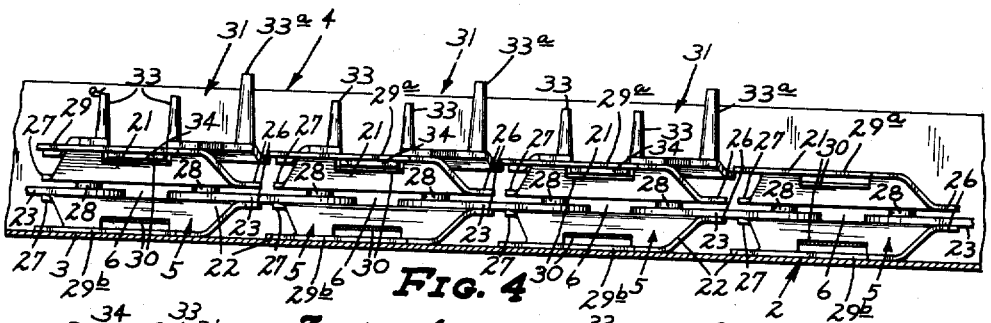
FIG. 4 is an enlarged view in vertical section taken on the line 4—4 of FIG. 1, and showing the conveyor elements in elevation, some parts being broken away.
Figure 5:
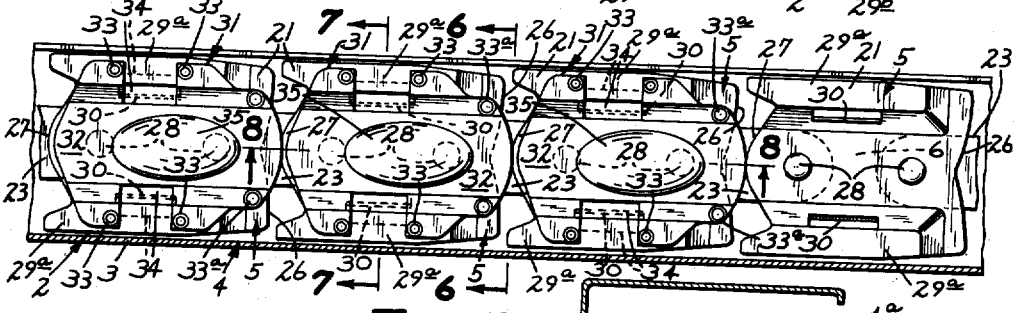
FIG. 5 is an enlarged view in top plan of that portion of my device shown in FIG. 4.
Figure 6:
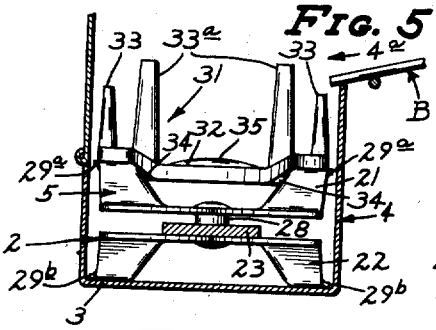
FIG. 6 is a further enlarged view in vertical section taken on the line 6—6 of FIG. 5, some parts being broken away, and also showing a portion of the nesting enclosures.
Figure 7:
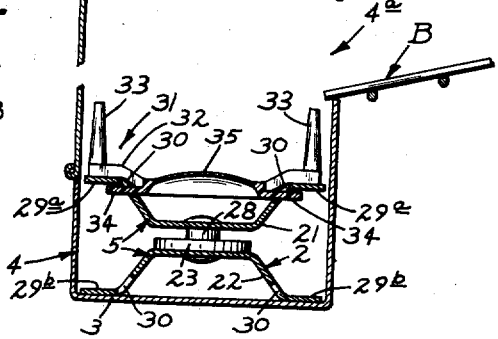
FIG. 7 is a further enlarged view in vertical section taken on the line 7—7 of FIG. 5, some parts being broken away, and also showing a portion of the nesting enclosures.
Figure 8:
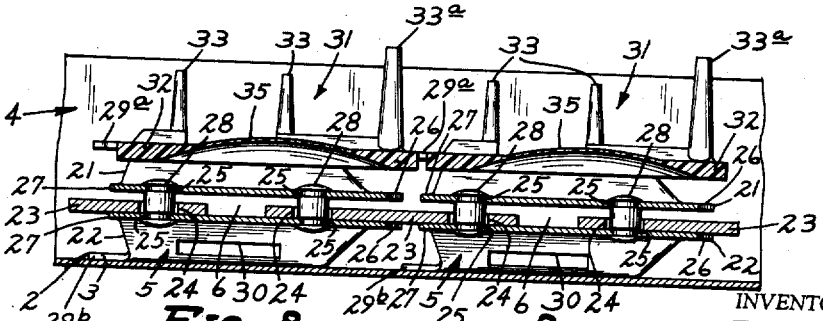
FIG. 8 is a further enlarged view in vertical section taken on the line 8—8 of FIG. 5.

With reference particularly to FIG. 3, it will be noted that an elongated slightly inclined egg removal arm 36 is secured to the upper shelf 9 of the table structure 7 and projects toward the conveyor 2 in a generally centrally longitudinal direction whereby to lift the eggs C from the egg collection trays 31 before the conveyor 2 descends through the opening 37 in the upper shelf 9 of the table structure 7. After the eggs C are lifted from the egg collection trays 31, they slide down the removal arm 36 onto the upper shelf 9 of the table structure 7 whereby they are disposed in a convenient position for any subsequent packing or cleaning operation, etc.

FIG. 2 illustrates a conveyor supporting stand 38 for disposing the conveyor 2 adjacent the nesting enclosures A, it being obvious that the supporting stand 38 may be of any desired height. It should be emphasized that my egg collection device 1 may be set up in any desired conveyor configuration so as to accommodate virtually any number of nesting enclosures A, which, of course, may be arranged in any desired geometric pattern. Further, my egg collecting device 1 may be employed with tiers of vertically spaced nesting enclosures A so as to increase the number of birds which may be accommodated with any given floor area. The table structure 7, upon which the eggs C are discharged may also be of any desired design, the disclosed structure thereof being merely for the purpose of illustration.

This invention has been thoroughly tested and found to be completely satisfactory for the accomplishment of the above objects; and while I have shown a preferred embodiment thereof, I wish it to be specifically understood that the same may be modified without departure from the scope and spirit of the appending claims.

What I claim is:

1. Egg collection trays formed from a flexible plastic material for use with an endless flexible egg collection conveyor, said trays each comprising a generally elongated base portion, means associated with said base portion for detachably securing said tray to said conveyor, a cross-sectionally reduced area defined by said base portion of said tray for cushioning the reception of an egg, and a plurality of upstanding [barrier] *finger* elements integrally formed with said base portion so as to selectively cradle an egg received therein.

2. An endless flexible egg collection conveyor comprising a plurality of conveyor link elements pivotally secured in end to end relationship with one another, a plurality of egg collection trays each of which is associated with one of said link elements, said trays each comprising a generally elongated base portion, means associated with said base portion for detachably securing said tray to said link element, a cross-sectionally reduced area defined by said base portion of said tray for cushioning the reception of an egg, and a plurality of upstanding [barrier] *finger* elements integrally formed with said base portion so as to selectively cradle an egg received therein.

3. An endless flexible conveyor for small articles adapted to ride on a guide track, said conveyor comprising a plurality of conveyor link elements, and fastening means for pivotally securing said link elements in end to end relationship with one another, said link elements each comprising upper and lower generally matching body sections, said upper body section being transversely cross-sectionally generally U-shaped and said lower body section being transversely cross-sectionally generally inverted U-shaped, each of said body sections defining opposed generally longitudinally extending generally co-planar supporting flanges, said adjacent upper and lower supporting flanges being spaced from and in general parallelity with one another, said upper supporting flanges being adapted to support article carrier means and said lower supporting flanges being adapted to ride in said guide track.

4. An endless flexible egg collection conveyor comprising a plurality of conveyor link elements pivotally secured in end to end relationship with one another, a plurality of egg collection trays each of which is associated with one of said link elements, said trays each comprising a generally elongated base portion, means associated with said base portion for detachably securing said tray to said link element in spaced relation thereabove, said means comprising opposed laterally projecting anchoring tangs integrally formed on said base portion, and opposed longitudinally extending slots defined by each of said link elements intermediate the ends thereof, the slots receiving said tangs when they are flexed inwardly and then snapped outwardly so as to securely anchor said tray to said link element, each of said trays further comprising means defined by said tray for cushioning the reception of an egg and comprising a cross-sectionally reduced centrally disposed area in said base portion, and a plurality of upstanding spaced [barrier] *finger* elements integrally formed with said base portion so as to selectively cradle an egg received therein.

5. An endless flexible egg collection conveyor adapted to ride on a guide track; said conveyor comprising a plurality of conveyor link elements; fastening means for pivotally securing said link elements in end to end relationship with one another; said link elements each comprising upper and lower generally matching body sections, said upper body section being transversely cross-sectionally generally U-shaped and said lower body section being transversely cross-sectionally generally inverted U-shaped, each of said body sections defining opposed generally longitudinally extending generally co-planar supporting flanges, said adjacent upper and lower supporting flanges being spaced from and in general parallelity with one another; said conveyor further comprising a plurality of egg collection trays each of which is carried by one of said link elements; said trays each comprising a generally elongated base portion, means associated with said base portion for detachably securing said tray to said link element in spaced relation thereabove, said last-mentioned means comprising opposed laterally projecting anchoring tangs integrally formed on said base portion of said tray, and opposed longitudinally extending slots defined on said upper body of each of said link elements intermediate the ends thereof, the slots receiving said tangs when they are flexed inwardly and then snapped outwardly so as to securely anchor said tray to said link element, each of said trays further comprising means defined by the base portion of said tray for cushioning the reception of an egg and comprising a cross-sectionally reduced centrally disposed membrane area in said base portion, and a plurality of upstanding fingers perimetrically spaced above said base portion and integrally formed therewith so as to selectively cradle an egg received therein.

6. Egg collection trays formed from a flexible plastic material for use with an endless flexible egg collection conveyor, said trays each comprising a generally elongated base portion, means associated with said base portion for detachably securing said tray to said conveyor, said tray being secured to said conveyor in spaced relation thereabove, flexible means defined by said base portion of said tray for cushioning the reception of an egg, said flexible means comprising a generally centrally defined cross-sectionally reduced area in said base portion, and a plurality of upstanding [barrier] *finger* elements integrally formed with said base portion so as to selectively cradle an egg received therein.

*7. In an egg collecting conveyor, an egg receiving and carrying tray formed of flexible material having a generally horizontal bottom wall, said wall having an area of increased resiliency providing a cushion within the margin thereof, and a plurality of egg confining fingers upstanding from said wall adjacent the margin of said area for direction and retaining an egg on said cushion.*

References Cited by the Examiner

The following references, cited by the Examiner, are of record in the patented file of this patent or the original patent.

UNITED STATES PATENTS

| | | | |
|---|---|---|---|
| 2,502,728 | 4/50 | Johnson | 198—131 |
| 2,626,701 | 1/53 | Avetta | 198—179 |

SAMUEL F. COLEMAN, *Primary Examiner.*

ERNEST A. FALLER, Jr., *Examiner.*